Feb. 7, 1961 W. H. SUMMERER 2,970,481
TUNER CONTROL
Filed April 5, 1956 3 Sheets-Sheet 1
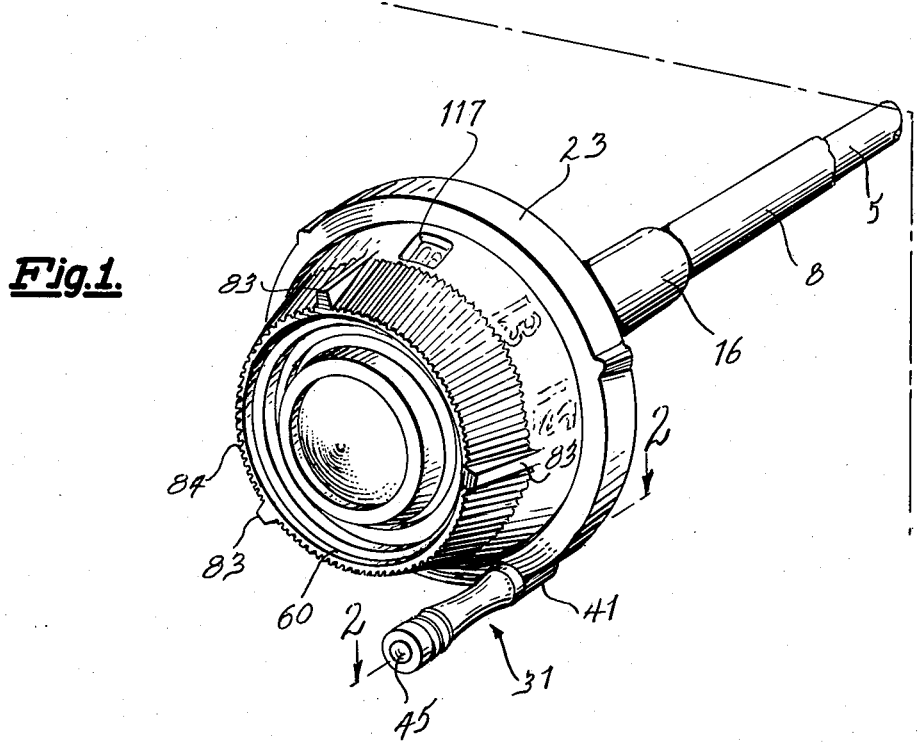
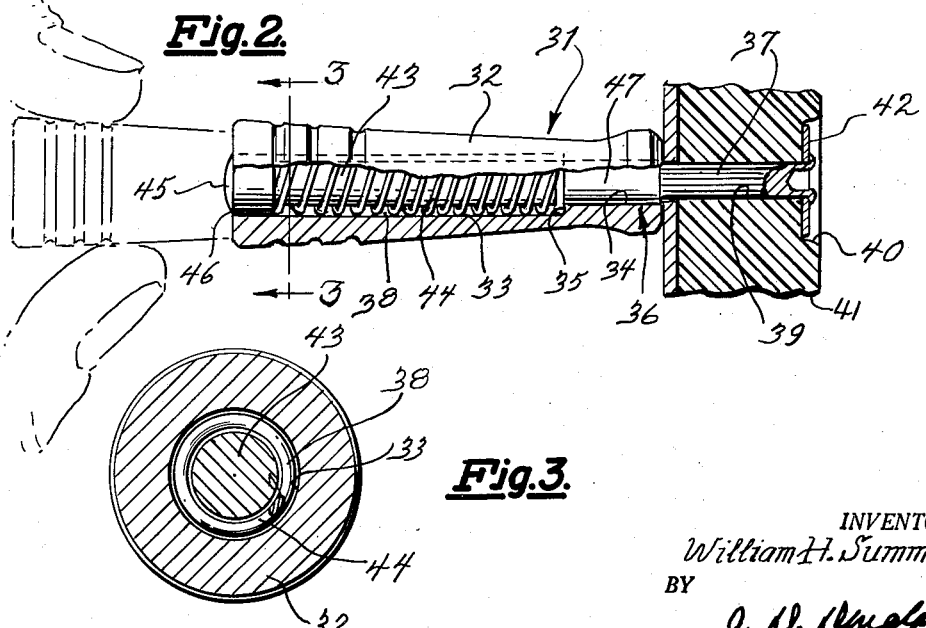
INVENTOR.
William H. Summerer
BY
J. N. Douglas
ATTORNEY

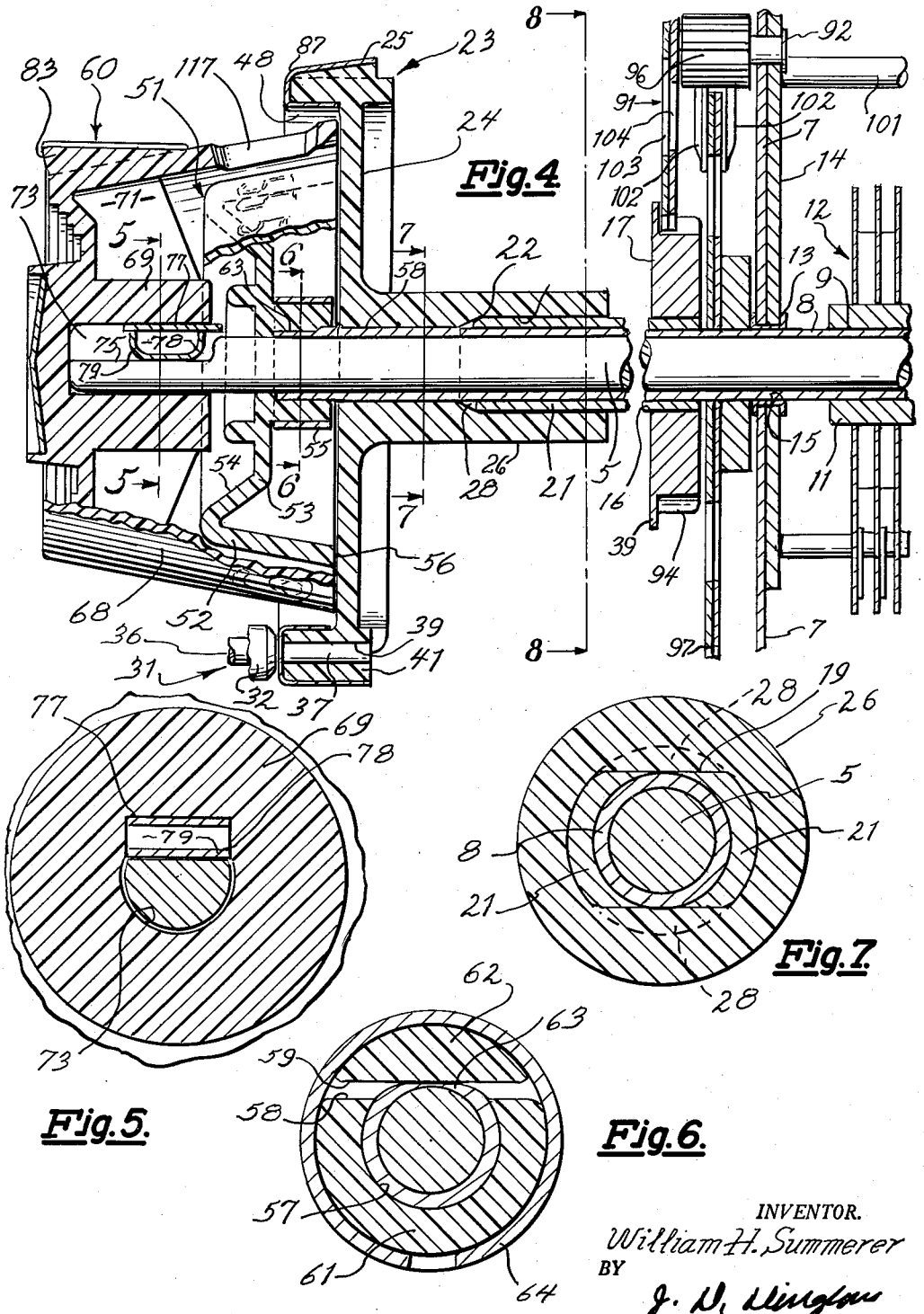

United States Patent Office 2,970,481
Patented Feb. 7, 1961

2,970,481

TUNER CONTROL

William H. Summerer, Des Plaines, Ill., assignor to Admiral Corporation, Chicago, Ill.

Filed Apr. 5, 1956, Ser. No. 576,436

1 Claim. (Cl. 74—10.45)

This invention relates to control devices and more particularly to improvements in adjustable control means for television receivers.

Manufacturers of present day television receivers are presenting larger and more complex units to the consumer, such as, color receivers, and combination receivers for operation in Very High and Ultra High frequency ranges.

Uppermost in the mind of the manufacturer is, the fact that the recipient of their labors, the ordinary layman, is not adept at adjusting a plurality of controls in the attempt to obtain the highest quality of reception and the manufacturer is constantly striving to simplify the operation and adjustment thereof.

This invention comprises a simple manually operable control apparatus for conditioning the tuner stage of a television receiver for reception of intelligence within an expanded frequency range containing Very High and Ultra High frequency signals.

An advantage of the present invention over the art as developed heretofore, is that one control device is used to obtain the desired signal in said expanded frequency range.

Another advantage is that in the Ultra High frequency range the control device is capable of continuous adjustment whereby the signal may first be selected, and then a further minute adjustment may be made by said control device to improve the reception of said signal.

Still another advantage is that the same control device is capable of providing minute adjustment of the tuner device within the Very High Frequency range.

Other advantages of the present invention will become more apparent to those skilled in the art and a more complete understanding thereof will be realized upon referring to the drawings accompanying the disclosure in which:

Fig. 1, is a perspective view of a control device partially illustrating the present invention;

Fig. 2, is an elevational sectional view taken on lines 2—2 of Fig. 1;

Fig. 3, is a sectional view taken on lines 3—3 of Fig. 2;

Fig. 4, is an elevational view, shown partially in section, of a complete embodiment of the control device;

Fig. 5, is a sectional view taken on lines 5—5 of Fig. 4;

Fig. 6, is a sectional view taken on lines 6—6 of Fig. 4;

Fig. 7, is a sectional view taken on lines 7—7 of Fig. 4;

Figure 8:
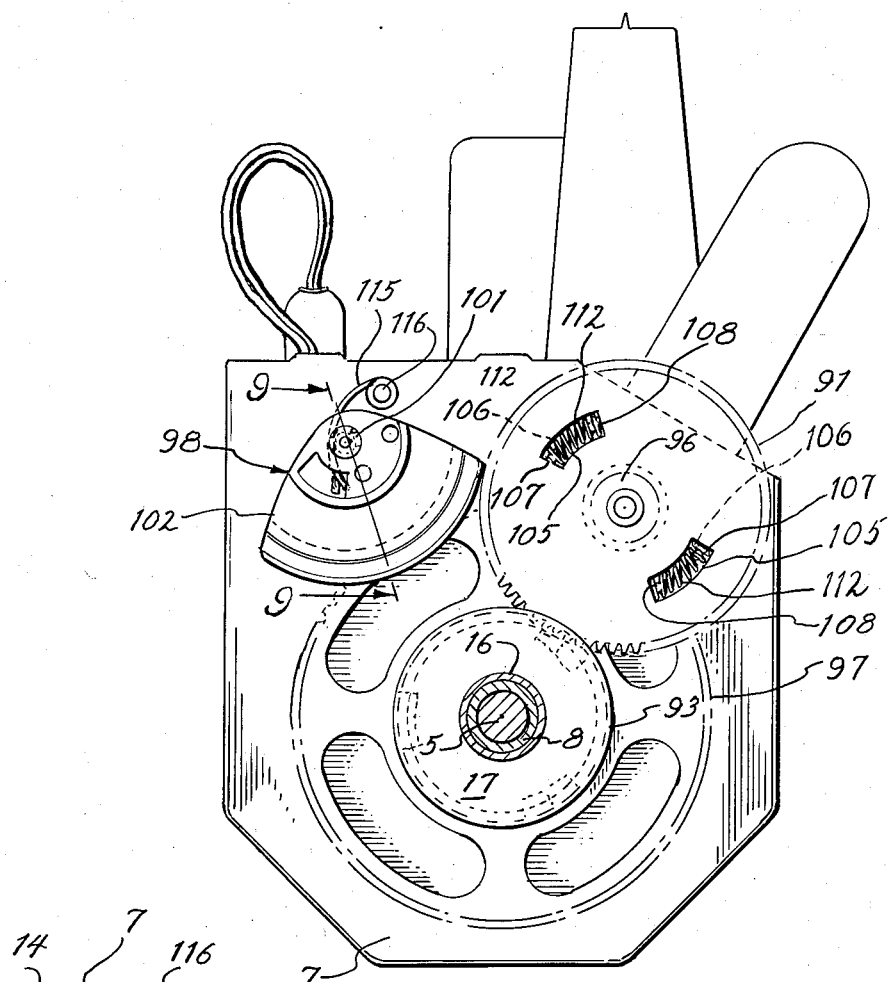
Fig. 8, is an elevational view, shown partly in section, taken on lines 8—8 of Fig. 4, and Fig. 9, is a fragmentary sectional view taken on lines 9—9 of Fig. 8.

Generally, the control mechanism of the present invention comprises a manually operable control member 60 connected to a shaft 5 which is operable to condition well known circuitry for selecting a plurality of predetermined frequencies within the Very High frequency range, and also capable of conditioning said circuitry for receiving intelligence within the Ultra High frequency range.

A drive mechanism comprising a control member 31, Fig. 4, selector knob 23, indicator member 51, connected sleeve 8 and sleeve 16 rotatably supported upon shaft 5 provide means, through a gear train, by which incremental frequency adjustment may be made within the Very High frequency range and also to provide continuous selection of a predetermined frequency within said Ultra High frequency range.

Referring now to the drawings throughout which like elements are designated by like reference characters; the structure shown in Figs. 4 and 8 partially illustrates one embodiment of a combination tuner device having a chassis (not shown) in which well known electronic components are housed and supported and which are operable by the control mechanism of the present invention to select a plurality of predetermined frequencies within the above desired expanded range.

More specifically, the numeral 5, Fig. 4, symbolizes an elongated round, solid shaft, adjacent one end of which well known movable switching elements (not shown) are securely mounted and which are operable to condition the tuner device for selection of signals in the Very High frequency range.

The shaft 5 extends through the front wall 7 of the tuner chassis, and the opposite end is rotatably secured to a back vertical wall (not shown) in any manner well known in the art.

A hollow cylindrical inner sleeve 8 embraces the solid shaft 5, one end 9 being secured in press-fit relationship within the bore of a rotor 11 upon which tunable elements 12 are mounted and which are operable to condition said tuner device for reception of signals in the Ultra High frequency range. The opposite end of said sleeve 8 extends outward from the front wall 7 of the tuner chassis and terminates adjacent a step 75 formed on the end of the solid shaft 5.

The solid shaft 5 and the sleeve 8 are rotatable relative to each other, and are in turn rotatably journalled in the front wall 7 of the tuner chassis by means of bushing 13, disposed in aperture 15 in said wall 7 and journal plate 14 attached to said wall, and which is in supporting engagement with the outer surface of sleeve 8.

A hollow outer sleeve 16 embraces the sleeve 8, being rotatable thereon; one end having a driving gear 17 rigidly affixed thereto, and the opposite end having diametrically opposed and longitudinally extending slots 19 found therein, defining curved arms 21, Fig. 7. The top and bottom edges of the arms 21 are curved sharply inward toward the slots 19, thereby providing opposed shoulders 22 adjacent the inner end of said slots 19.

A selector knob 23, Figs. 1 and 4, comprising a disc-shaped base member 24 having an annular flange 25 formed integrally about the periphery thereof and a centrally disposed hub 26, having a stepped bore 27 defining diametrically opposed stops 28, is placed over the end of the outer sleeve 16, the surface of said bore 27 being in pressure engagement with the arms 21, and the stops 28 in abutting relationship with shoulders 22.

A control member 31 rigidly attached to knob 23 provides means for manual manipulation of the selector knob and sleeve 16. The member 31 comprises a handle 32, having connecting internal bores 33 and 34 placed axially therethrough defining an annular shoulder 35 at their junction.

The handle 32 is movably secured to the knob 23 by means of a shaft 36, Fig. 2, having one end 37 of reduced diameter extending into aperture 39 formed in a boss 41 on the knob.

A counterbore 40 is provided on the inner end of the boss connectin with aperture 39. A retaining washer 42 is placed therein over the extremity of end 37 of shaft 36, and said extremity is then peened over the outer surface of said washer securing said shaft within said aperture 39. Axially of end 37, mid-portion 47 of said shaft 36 extends through bore 34; being in slidable engagement therewith. The end 43 of said shaft, opposite to end 37, being of reduced diameter relative to mid-portion 47, extends into bore 33 providing a clearance 38, Fig. 3, therebetween. A coil spring 44 is placed over end 43, within said clearance, one end abutting against annular shoulder 35 and the opposite end engaging cap member 45 placed within the open end 46 of bore 33, and disposed over the extremity of end 43 of said shaft.

The handle 32, as shown in Fig. 2, is capable of being grasped and moved axially upon said shaft to a plurality of extended positions, one such position being illustrated in dotted lines in Fig. 2, to provide a more readily accessible and regulatory member for the knob 23 and sleeve 16.

The base member 24 and annular flange 25 of said selector knob 23, define a shallow concavity 48, Fig. 4, for the partial reception of an indicator member 51, and a control member 60, to be presently described.

The indicator member 51, is generally of round configuration having an outer shell in the shape of a frustrum of a cone 52, integrally connected to a central disc 53 by an inwardly extending wall 54. A hub 55 integrally connected to the central disc 53 extends axially therefrom and terminates coplanar with the edge 56 of shell 52.

A bore 57, Figs. 4 and 6, is formed centrally within the hub 55 and extends through the disc 53. A slot 58, having parallel walls 59, extends across and into the hub intersecting with the bore 57, thereby providing a generally C-shaped support portion 61 and a segmental pressure arm 62.

The indicator member 51 is positioned adjacent the base of the indicator knob 23 by inserting the free ends of shaft 5 and sleeve 16 through bore 57. A flat 63, formed on said free end of sleeve 16 engages the wall 59 of arm 62, and a metallic spring clip 64, disposed about the periphery of hub 55 exerts sufficient force to releasably secure said indicator member 51 to said sleeve 16, while permitting solid shaft 5 to be freely rotatable within said sleeve.

Suitable indicia, represented by numeral "56," Fig. 4, may be placed about the outer surface of circular shell 52 to provide visual means for adjusting the tunable elements 12 of the tuner device to a plurality of selected positions within the Ultra High frequency range.

The control member 60, Fig. 4, is generally of frustroconical configuration having a thin outer shell 68 and a centrally disposed internal hub 69 defining a cavity 71. A blind hole 73 generally D-shaped cross-sectionally is formed axially within the hub 69.

The end of solid shaft 5 is of stepped configuration defining a flat 75. The control member 60 is placed over the indicator member 51 in such manner that the end of shaft 5 enters into blind hole 73, and said member 51 is disposed within the concavity 71. A retainer spring, Figs. 4 and 5, disposed within said blind hole 73, and having spaced upper 77 and lower 78 parallel sides integrally connected by legs 79 and a semicircular portion enveloping the end of shaft 5 exerts sufficient pressure between the top surface of the hole 73 and the flat 75 of shaft 5 to resiliently secure said control member 52 upon shaft 5.

The outer surface of the control member 60 may be formed with radially spaced fins 83, and serrations 84, Fig. 1, to enable said member to be securely grasped and easily rotated.

A metallic plate 87 enclosing the flange 25 and boss 41 of selector knob 23 and extending radially inward over the surface of base 24, provides a protective covering and also prevents said control member 52 from engaging and becoming seized upon said base.

The solid shaft 5, as hereinbefore disclosed, is attached to the movable switching elements operable within the Very High frequency range. The control member 60, is adapted to rotate said shaft and move said elements to any desired position, and suitable indicia may be placed upon the outer surface of the control member, as shown in Fig. 1, to indicate the position of said elements.

A drive gear 17, Figs. 4 and 8, is rigidly attached to the end of the sleeve 16, adjacent the front wall 7 of the tuner chassis, and is in meshing engagement with idler gear unit 91 composed of gear members 103 and 104 rotatably secured to the front wall 7 of the tuner chassis by stud shaft 92. An annular flange 93 formed on one side of gear 17 and in extension of gear teeth 94 prevents said gear 17 and sleeve 16 from possible movement along sleeve 8 and into abutting engagement with driven gear 97. A follower gear 96, securely fastened to stud shaft 92 and rotatable therewith and interposed between gear 91 and wall 7 of the chassis is in meshing engagement with driven gear 97 rigidly affixed to hollow shaft 8.

Figure 9:
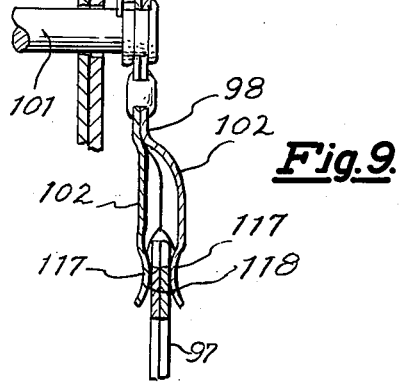

A generally arcuate-shaped follower 98, mounted upon one end of a shaft 101 and having resilient spaced arms 102 in frictional engagement with driven gear 97, Fig. 9, is rotatable through a predetermined arc by said gear 97 to provide adjustment to movable tunable elements (not shown) connected to the end of shaft 101 opposite to follower 98, and which are operable within the Very High frequency range to obtain a fine tuning adjustment.

A leaf spring 115, Figs. 8 and 9, having one end secured to stud 116 and extending therefrom, around shaft 101 to follower 98 whereat the opposite end is securely fastened, prevents said follower 98 from partaking of independent rotative movement relative to driven gear 97, and resultant subsequent movement of the movable tunable elements attached to shaft 101.

The spaced arms 102 extend over on each side of driven gear 97, and are formed with inwardly extending arcuate ribs 117 having inner surfaces 118 in pressure engagement with the juxtaposed surfaces of said gear.

The idler gear 91 is of the anti-backlash type well known in the art.

The Ultra High frequency movable tunable elements 12 mounted on sleeve 8 are rotatable to their desired position by force being supplied, through the handle 31 and selector knob 23, to sleeve 16 and drive gear 17. This force is then transmitted by idler 91, and follower gear 96 to driven gear 97. Said driven gear 97, being rigidly affixed to the inner sleeve 8, transmits said force thereto and rotates rotor 11 carrying with it said tunable elements 12.

The selector knob 23 and sleeve 16 are capable of being continuously rotatable in either direction, and the above-mentioned gear train interconnecting said selector knob and rotor 11 is capable of transmitting said selective force to move said tunable elements in said selective rotative elements to the desired position. The indicator member 51 being attached to the end of sleeve 8 is rotatable therewith. A window 117, Figs. 1 and 4, placed in the shell 68 of control member 60, opening into cavity 71 directly above the indicator member 51, enables the operator to visually regulate and adjust the movable tunable elements 11 to the desired position.

As heretofore disclosed, the control member 60 and attached solid shaft 5 are capable of moving the switching elements attached to said shaft to their desired position. Said control member 60 and shaft 5 are also movable to a predetermined position wherein said switching elements are disconnected from their associated tuner circuitry (not shown), and at the same time the tunable elements 11 connected to sleeve 8 are connected to their associated tuner circuitry (not shown) in readiness to receive intelligence in said upper frequency range.

When said control member 60 and attached shaft 5 are moved to a position wherein the switching elements carried by said shaft 5 and associated tuner circuitry are conditioned for receiving intelligence in said lower frequency range, incremental frequency adjustment within said lower range may also be obtained by force being applied through control member 31, selector knob 23 and sleeve 16 to drive gear 17. Said force is then applied through idler gear 91 to follower gear 96 and thence to driven gear 97, a segment of which is clamped between arms 102 of arcuate follower 98. When the driven gear 97 is rotated, it is capable of swinging follower 98 and attached shaft 101 within a predetermined arc to minutely adjust the tunable element (not shown) carried by said shaft 101.

Having thus described one embodiment of my invention I am aware that extensive departures may be made therefrom without departing from the scope of the appended claims.

I claim:

Tuning control apparatus for a television receiver operable in both the U.H.F. and V.H.F. ranges, comprising, a first control knob manually operable to coarse tune the receiver in the V.H.F. range, a second control knob manually operable to tune the receiver in the U.H.F. range and simultaneously to fine tune the receiver in the V.H.F. range, a first shaft connecting said first control knob to a first tuning means for coarse tuning in the V.H.F. range, a second shaft operably associated at one end thereof with a second tuning means for tuning in the U.H.F. range, an indicator means positioned at the other end of said second shaft for indicating the position of said second tuning means, a third shaft connected to said second control knob, reduction drive means continuously connecting said second and third shafts for reduced speed rotation of said second shaft when said third shaft is rotated by said second control knob, and coupling means operably associated with said second shaft and a third tuning means for fine tuning in the V.H.F. range, said first, second and third shafts coaxially mounted and rotatable relative to each other.

References Cited in the file of this patent

UNITED STATES PATENTS

| | | |
|---|---|---|
| 2,097,384 | Segeal | Oct. 26, 1937 |
| 2,567,860 | Shapiro | Sept. 11, 1951 |
| 2,579,659 | Fisher | Dec. 25, 1951 |
| 2,604,791 | Daly | July 29, 1952 |
| 2,605,735 | Ware | Aug. 5, 1952 |
| 2,613,540 | Keim | Oct. 14, 1952 |
| 2,711,711 | Harman | June 28, 1955 |
| 2,738,758 | Cutler et al. | Mar. 20, 1956 |
| 2,756,599 | Sperber | July 31, 1956 |
| 2,773,390 | Oeler | Dec. 11, 1956 |
| 2,788,668 | Sperber | Apr. 16, 1957 |
| 2,824,957 | Meadows et al. | Feb. 25, 1958 |

FOREIGN PATENTS

| | | |
|---|---|---|
| 439,152 | Great Britain | Nov. 29, 1935 |
| 616,676 | France | Oct. 30, 1926 |
| 618,026 | France | Nov. 30, 1926 |
| 634,779 | France | Nov. 30, 1927 |